June 7, 1932.  W. F. HELMOND  1,862,015
TYPEWRITING MACHINE
Filed July 19, 1929
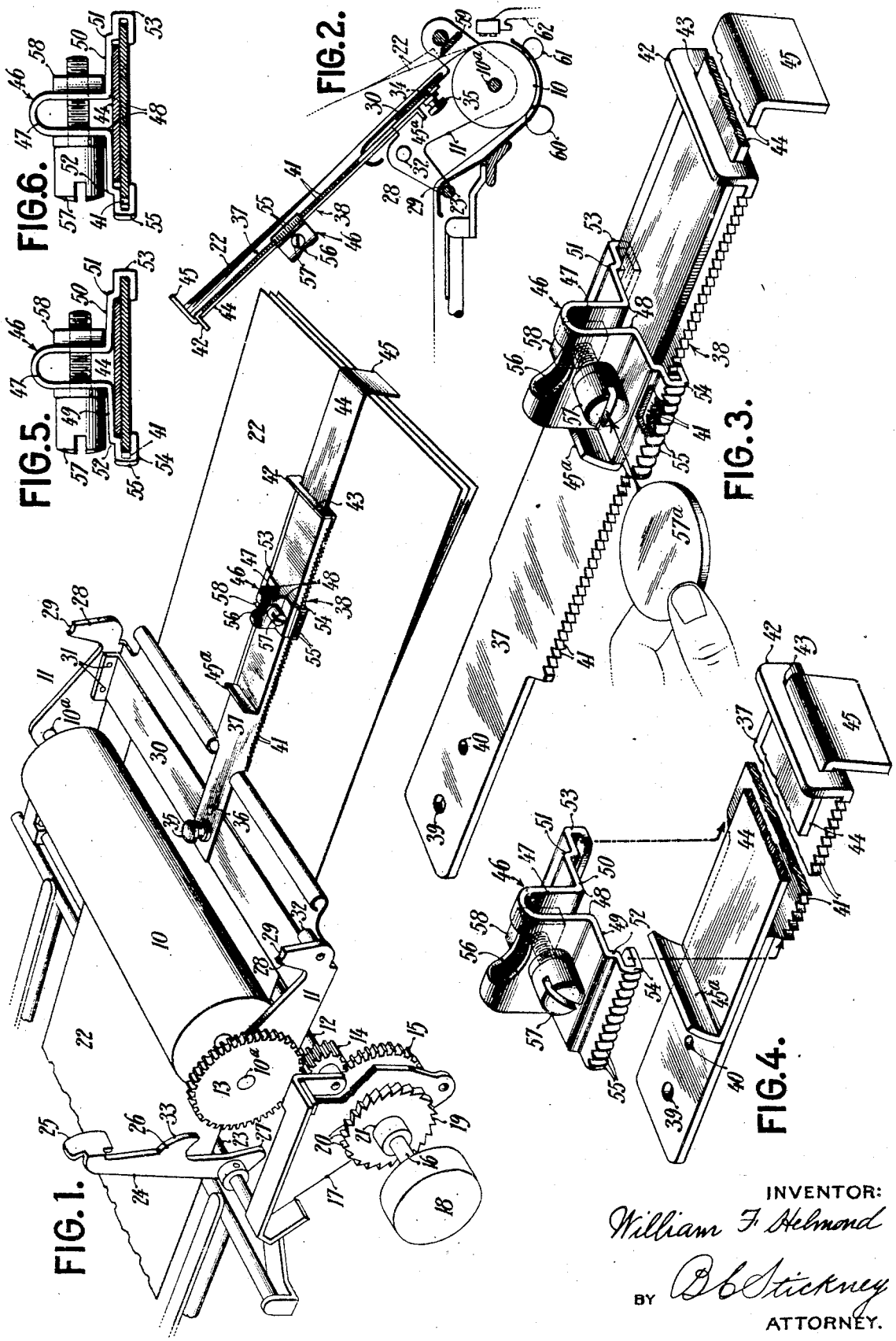
INVENTOR:
William F. Helmond
BY D. b. Stickney
ATTORNEY.

Patented June 7, 1932

1,862,015

UNITED STATES PATENT OFFICE

WILLIAM F. HELMOND, OF WEST HARTFORD, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed July 19, 1929. Serial No. 379,435.

This invention relates to typewriting machines, and is herein disclosed as a leading-end gage applied to a standard Underwood fan-fold or billing type of machine, or any web-feeding machine where it is desired to gage the typed forms to a tearing-off position.

Heretofore a long metal arm was attached to the typewriter-carriage, and a gage was frictionally mounted on said arm so as to be shiftable up and down to measure various lengths of forms to be cut off. This long arm was found objectionable, especially where long forms were used. When the operator displaced the platen and the long arm, constant care had to be taken to avoid hitting the arm, and, furthermore, the arm was frail and vibrated a great deal, which was objectionable.

One object of this invention is to provide a gage or stop which, when fastened in position, will be positively held. For this purpose, an adjustable stop is slidably mounted upon a table or plate having one of its edges provided with serrations into which a series of teeth on one side of the adjustable stop interlock, so that when said stop is adjustably clamped fast to the plate the teeth will eliminate any danger of a stop position changing by the slipping of the stop constructed by rolling, and a suitable pressing process can be used for making the corresponding teeth on the clamp.

Other objects provide for a novel web-gage that is slidable relatively to the adjustable stop so as to drop by gravity to an abnormally low position when not in use and be manually shiftable to the adjustable stop for an extended web-end-gaging position when the typed web is to be severed.

Other features and advantages will hereinafter appear.

In the accompanying drawing,

Figure 1 is a perspective view, partly broken away, of an Underwood fan-fold typewriting machine showing only the platen, platen-frame and leading end-gage arranged to be drawn with the web into a web-severing stop position.

Figure 2 is a side view from left to right of the machine partly in section.

Figure 3 is a perspective view of the gage with the clamp open to be set along the supporting plate.

Figure 4 is a perspective view of the supporting plate, slide and stop, the plate and slide partly broken away and showing how they can be assembled.

Figure 5 is an end view of the clamp, with the slide and plate in section, and shows the position of the parts when clamped.

Figure 6 is a view similar to Figure 5 showing the parts unclamped ready for adjustment.

In Figure 1 of the drawing is shown a usual Underwood fan-fold typewriting machine having the stop-gage applied and showing only the essential working parts. A platen 10 is mounted on a shaft $10^a$ journaled in a platen-frame 11 which is hinged upon and swings around a shaft 12. The usual gear 13 is fast to the platen-shaft $10^a$ and this meshes in a wide pinion 14 which is mounted to rotate on this shaft 12. Another gear 15 is rigidly mounted on a shaft 16 which is journaled in the usual carriage-frame 17. The shaft 16 has mounted on it in the usual manner a hand-wheel 18 and a ratchet-wheel 19 with teeth 20 and a pawl and mechanism, not shown. This mechanism is not a part of the invention, but is of a well-known construction in fan-fold typewriters.

The gears 13 and 15 are parallel to one another, and the pinion 14 is of sufficient width to mesh into both the gears 13 and 15 at all times.

The platen-frame 11 is hinged upon and swings around the shaft 12, and the gear 13 remains in mesh with the pinion 14, and when the hand-wheel 18 is turned, the gear 15, mounted on the shaft 16, turns the pinion 14, and the gear 13 rotates the platen 10 and feeds the sheets or webs 22. The ratchet-wheel 19 is secured to the shaft 16 by means of a hub 21 and a set-screw, not shown.

At the rear of the carriage-frame 17 is a rock-shaft 23 pivoted in both ends of the frame and having secured thereto a lever 24 formed with a thumb-piece 25 and a hook 26. The shaft 23 may be rocked by a coil-spring, not shown, to swing the lever 24 forward until checked by a downwardly-extending lug 27 which strikes a part of the carriage-frame.

On each side of the platen-frame is formed a platen-aligning foot 28 with a rounded seat 29 to rest on the rod 23 when the platen-frame is in its normal operative position. Across the rear of the platen-frame 11 is a wide plate or strip 30 secured by rivets 31 at each end.

On the left-hand side of the platen-frame 11 is a roller 32 which, when the platen 11 is swung back to its normal position, strikes a cam-face 33 on the front, pushing the arm 24 backward against its spring, and causing the hook 26 to snap over the roller 32.

The center of the strip 30 may have a fixed threaded pin or stud 34 on which a thumb-nut 35 may be threaded and also have a dowel-pin 36. Secured to this strip 30 is a plate or supporting member 37 for a gage 38 which, by means of holes 39 and 40 fitting over the stud 34 and the pin 36 is clamped in place by the thumb-nut 35.

This plate, shell or table 37 of the gage 38 has small serrations or saw-teeth 41 formed on one edge. The upper end of the plate 37 has a right-angle bend, forming a lip 42 having a slot 43 of such a size as to loosely fit a slidable member 44. The upper end of the slide 44 is bent substantially at right angles to form a stop-gage 45, and the other end of 44 is also bent at right angles to form stop-end 45a.

By reference to the drawing it will be observed that the lower end of the plate 37 is narrowed down to the same width as the slide 44 for a purpose which will hereinafter appear.

In order to satisfactorily use this extensible gage 45 the slide 44 may be readily extended, accurately guided, and positively stopped when fully extended. This is accomplished by the combination gage guide and stop 46, which consists of a U-shaped section 47 bent outwardly at 48 to form two feet 49 and 50, then offset at 51 and 52 to form a channel to enclose and guide the slide 44, and then the free ends bent upon themselves to form U-shaped ways 53, 54 at each side, to slide upon the edges of the plate 37. The channel formed by the offsets 51 and 52 is just sufficient to free the slide 44 for a running fit therebetween, and the size of the U-shaped guides 53, 54 will allow the member 44 to slide freely over the fixed plate 37.

The U-shaped edge of the gage guide and stop 46 on the side of the serrated edge of the plate 37 is also made with teeth or serrations 55 to fit the corresponding edge of the plate 37.

This gage guide and stop 46 is made of spring sheet-metal, and, in order to make the yoke 47 to yield more readily, a portion is cut away at 56. The spread of the guide 46 is controlled by a bolt having a long slotted head 57 on one side, and a square nut 58 on the other side of the yoke. The slot in the head 57 is made of such a size that an ordinary coin, like a nickel or a cent, as shown at 57a, will fit therein, so as to substitute for a screwdriver. This is possible because the head 57 is made long enough to extend out to the side of the plate 37.

When the members 37 and 44 are placed in the assembled position shown in Figure 4, the combined stop and guide 46 will pass over both edges until the parts 49, 50 rest on the slide 44. Then by sliding the stop 46 upon the plate 37, the U-shaped edges 53, 54 will slide over the wider edges of the plate. By turning the head of the bolt 57 until the U-shaped edges 53, 54 are compressed to clamp over the edges of the plate 37 as shown in Figure 3, the teeth 55 will interlock with the teeth 41 and thus positively hold the stop 46 in the adjusted position along the plate 37. By reference to Figure 2, it will be seen that a bar 59 acts as a knife for tearing off the sheets 22, and feed-rolls 60, 61 co-operate in the ordinary way with the platen 10. The proper relation of the type-bar 62 to the platen is also shown diagrammatically.

The fan-fold web is fed into the machine and the first form typed and fed to a severing position indicated by the knife 59. The platen is now released from the latch 24 and swings forwardly to the position of Figure 1. The leading-end stop 45 is brought to the leading edges of the web 22 and the stop 46 is unclamped by releasing the bolt 57 and then shifted along the plate 37 to the adjusted position of the stop 45a, as shown at Figure 3, and the stop 46 reclamped to the plate. The platen is now restored to the Figure 2 position and the typed form severed from the web.

It will be noted that after the web-end is severed, the slide 44 will drop by gravity to the Figure 2 position where the gage 45 will rest upon the lip 42 and the height of the gage equals the height of the plate 37 and not the gaging height of the slide 44; that the dropping of the slide 44 by gravity when not employed as a gage, eliminates the heretofore greatly extended gage that was so objectionable especially when displacing the platen; and that the gage 45 may be brought against the leading end of the typed web as at Figure 1, and clamped against the slide 44 by the thumb and a finger and the web and slide drawn forwardly until the lip 45a is arrested by the stop 46 as at Figure 3.

Variations may be resorted to within the scope of the invention, and portions of the improvements may be used without others.

Having thus described my invention, I claim:

1. In a typewriting machine, the combination of a web-support, a member rigid with said support, a guide on said member, a slide to pass through said guide, an adjustable stop on said member, means on said stop to further guide the slide, and means on the slide to limit its sliding movement by engaging the stop.

2. In a typewriting machine, the combination of a support, a rigid member detachably secured to the same, a fixed guide on said rigid member, an adjustable guide, a member slidable through both of said guides, and stop means on said adjustable guide for limiting the movement of the sliding member.

3. In a typewriting machine, the combination of a web-gaging support, a fixed member detachably secured thereto, a slot in the forward end of said member, an adjustable guide detachably secured to said fixed member and having a channel, a member slidable through said slot and channel, and stop means on said adjustable guide for limiting the movement of said sliding member.

4. In a typewriting machine, the combination of a web-gaging support, a fixed member detachably secured to said support, a guide in the end of said fixed member, a guide adjustable upon said fixed member, a member slidable upon said fixed member by passing through both guides, and means for limiting the movement of said slidable member, including a stop on the sliding member to strike the adjustable guide.

5. In a typewriting machine, the combination of a web-support, a rigid member detachably secured to said web-support, a fixed guide on the forward end of said rigid member, an adjustable guide, a positive holding means for said guide on said member, and a slidable member with an upturned rear end, passing through said guides and moving freely therethrough.

6. In a typewriting machine, the combination of a web-gaging support, a rigid member detachably secured thereto at one end, a fixed guide at the other end, an adjustable guide, a positive locking means for holding the adjustable guide in any adjusted position on the rigid member, a member mounted in said guides to slide freely therethrough, and stop means including an upturned end on said slidable member to engage the adjustable guide and limit the forward movement of the sliding member.

7. In a typewriting machine, the combination of a web-gaging support, a detachable member rigidly fastened thereto at one end, a fixed guide on the other end, a guide slidable and adjustable on said member, interlocking means on said member and on said slidable guide for holding said guide positively in any adjusted position, and a member slidable by passing freely through said guides and having a bent-over end to limit the movement of the sliding member by its engagement with the adjusted guide.

8. In a typewriting machine, the combination of a web-gaging support, a member secured thereto at one end, a guide at the other end of said member, a slide to pass freely through said guide, a stop for the slide, slidable over both said member and said slide, a set of teeth on said member, a corresponding set of teeth on the stop, and means for interlocking the two sets of teeth to hold the stop fixed to said member when arresting the slide.

9. In a typewriting machine, the combination of a web-gaging support, a member secured thereto at one end, a guide on the other end of said member, a slide to pass freely through said guide, a stop at one end of the slide, a gage at the other end of the slide, and an adjustable stop for limiting the movement of said gage, by arresting the stop on the slide, said member having notches along one edge and the adjustable stop having corresponding teeth to fit into said notches, and a clamp to hold said teeth in said notches in any adjusted position on said member.

10. In a typewriting machine, the combination of a web-gaging support, a rigid member secured thereto, a combined stop and guide slidably adjustable on said member and compressible thereto, a slide to pass freely through said guide and along said member, a stop at one end of said slide, notches in the edge of said rigid member, teeth on said combined stop and guide to co-operate with said notches, and a screw-operated clamping device to compress the combined stop and guide upon said member and positively hold its stop at any adjusted position to arrest the stop on the slide.

11. In a typewriting machine, the combination of a web-gaging support, a rigid member therefor, a guide on the end of said member, a combined stop and guide slidably and adjustably secured to said rigid member, a member to slide freely through said guides, a gaging stop on said slide, notches in the edge of said rigid member, corresponding teeth on said combined stop and guide, and means for bringing said teeth into said notches to lock the adjusted stop at a slide-stopping position.

WILLIAM F. HELMOND.